No. 614,017. Patented Nov. 8, 1898.
D. MARCOTT & G. ESVELDT.
TIRE TIGHTENER.
(Application filed May 5, 1898.)
(No Model.)
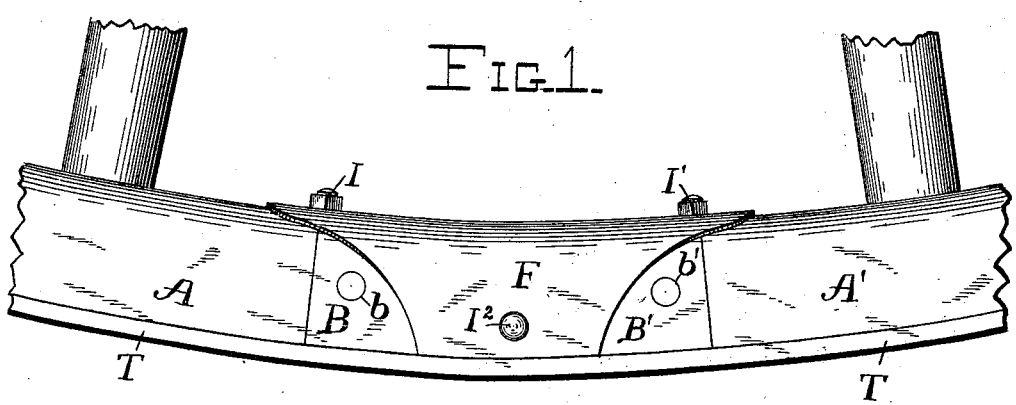
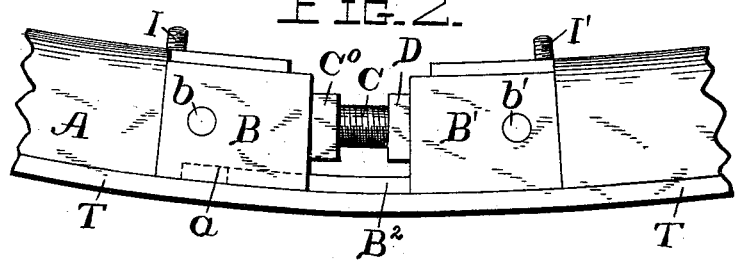
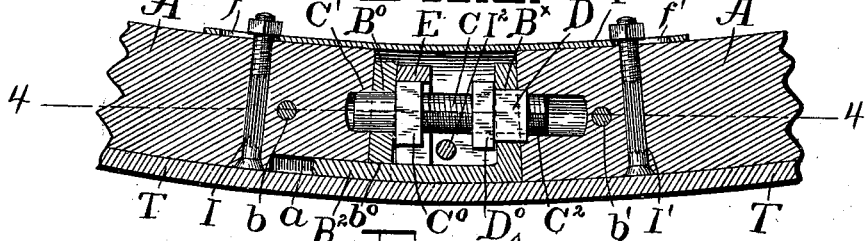
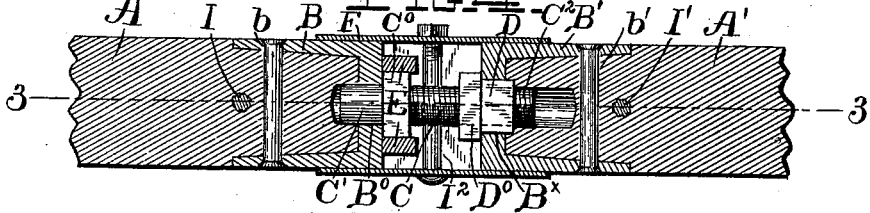
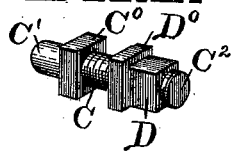
Witnesses
D. H. Blakelock
John Chalmers Wilson
Inventors
D. Marcott
G. Esveldt
by Wilkinson & Fisher
Attorneys
THE NORRIS PETERS CO., PHOTO-LITHO., WASHINGTON, D. C.

UNITED STATES PATENT OFFICE.

DEMOSS MARCOTT AND GERARD ESVELDT, OF SPOKANE, WASHINGTON, ASSIGNORS OF ONE-THIRD TO WALTER L. FINTON, OF SAME PLACE.

TIRE-TIGHTENER.

SPECIFICATION forming part of Letters Patent No. 614,017, dated November 8, 1898.

Application filed May 5, 1898. Serial No. 679,856. (No model.)

*To all whom it may concern:*

Be it known that we, DEMOSS MARCOTT and GERARD ESVELDT, citizens of the United States, residing at Spokane, in the county of Spokane and State of Washington, have invented certain new and useful Improvements in Tire-Tighteners; and we do hereby declare the following to be a full, clear, and exact description of the invention, such as will enable others skilled in the art to which it appertains to make and use the same.

Our invention relates to improvements in means for compensating for the relative expansion and contraction of the tires and fellies of vehicle-wheels; and it consists in the novel devices and combination hereinafter described and claimed.

Our invention will be clearly understood by reference to the accompanying drawings, wherein the same parts are indicated by the same letters throughout the several views.

Figure 1 represents a fragmentary side elevation of a portion of the rim of a wheel in the region of one of the joints of the felly. Fig. 2 represents a similar view with the protective plate omitted. Fig. 3 represents a section taken on the line 3 3 in Fig. 4. Fig. 4 represents a section taken on the line 4 4 in Fig. 3, and Fig. 5 represents a perspective view taken of the adjusting screw and nut detached.

A A' represent the two sections of the felly, the adjacent ends of which do not come entirely together, but allow sufficient space for the compensating devices hereinafter described. Over the ends of these sections A and A' are fitted U-shaped caps B and B', respectively, of metal, and these caps are so fitted to the ends of the felly that their outer side surfaces will be flush with the sides of the said felly and are held securely in position by means of rivets $b$ and $b'$. In the head of one of these U-shaped caps, such as B, is provided a circular opening $B^0$, the said opening extending into the end of the section A of the felly a short distance, and the other of said U-shaped caps B' has a squared opening $B^\times$ through its head, and this opening has a continuation extending into the end of the section A', which opening may be squared, but is preferably circular, as shown in Figs. 3 and 4. Upon one of the said U-shaped caps, such as B', is formed an integral tongue $B^2$, which extends beyond the end of the section A' of the felly, with its outer surface slightly convex and forming a continuation of the tread-surface of the felly. The section A of the felly is recessed correspondingly upon its tread-surface, as at $a$, and the head of the cap B is also cut away at its outer edge, as at $b^0$, to receive the said tongue, which is allowed to be flush with the tread portion of the section A of the felly, as seen in Figs. 2 and 3.

The tire T incloses the felly in the usual manner.

The device for compensating for the relative expansion and contraction of the felly consists of a screw bolt or pin C, having a squared boss $C^0$ rigidly mounted thereon near one end thereof, the shorter end $C'$ of said bolt or pin being cylindrical and smooth and the longer end $C^2$ being screw-threaded throughout. A squared nut D, having a boss $D^0$ thereon, engages the screw-threaded portion $C^2$ of the said bolt or pin. In use, the smooth shorter end $C'$ of the said bolt or pin C fits into the circular opening $B^0$ in the head of the cap B, wherein it is free to turn, and the nut D fits into the squared opening $B^\times$ in the cap B', wherein the said nut is held against turning. The bolt or pin is turned by means of a wrench, which is applied to the squared boss $C^0$ thereon, and this turning of the screw bolt or pin causes the latter to advance or retire through the nut D, accordingly as the said screw is turned forward or backward, as will be obvious. By this means it will be readily seen that the felly may be kept tight at all times, but that when desired may be loosened up and allow the tire to be removed by a simple manipulation of the screw bolt or pin C, as above described.

The screw is locked against turning by means of a U-shaped frame or staple E, which fits over the squared boss $C^0$, and the joint is inclosed by a clip F, of sheet metal, somewhat similar to the ordinary construction of such clips, with the exception that the side edges of the clip F extend to the outer edge of the felly and are wider than those ordinarily used. Besides the ordinary bolts I and I', passing radially through the felly, the clip is further held by one or more bolts passing transversely through the recess between the ends of the felly, as shown at I² in Figs. 1, 3, and 4. The openings in the said clip F for the passage of the radial bolts I and I' are elongated, as shown at $f$ and $f'$, to allow for the relative movement of the radial bolts I and I' as the felly is tightened.

Having thus described our invention, what we claim, and desire to secure by Letters Patent of the United States, is—

1. In a tire-tightener, the combination with a pair of metallic plates adapted to fit upon the opposite ends of the felly, the one plate having a circular opening therethrough, and the other having an angular opening therethrough; of a pin having a squared boss rigidly thereon near one end thereof, the shorter end of said pin being cylindrical and smooth, and the longer end being screw-threaded; an angular nut fitting said screw-threaded portion of said pin and adapted to fit the angular opening in one of said plates; a boss on said nut; the smooth end of said pin being adapted to fit the circular opening in the other of said plates; and a staple adapted to fit over the said squared boss on said pin and lock the latter against turning, substantially as described.

2. In a tire-tightener, the combination with a pair of metallic plates adapted to fit upon the ends of the felly, the one plate having a circular opening therethrough, and the other having an angular opening therethrough; of a pin having a short smooth cylindrical portion adapted to fit said circular opening, and a longer screw-threaded portion; an angular boss rigidly on said pin between said smooth and screw-threaded portions thereof; an angular nut adapted to fit said angular opening, and having a boss thereon, the said nut fitting the screw-threaded portion of said pin; a staple adapted to fit over said squared boss on said pin; a curved plate or clip adapted to fit over the joint of the felly; and a bolt adapted to pass transversely through the side edges of said curved plate or clip, substantially as described.

3. In a tire-tightener, the combination with a pair of metallic plates fitting upon the opposite ends of the felly and having opposite openings therethrough; of a pin having a square boss rigidly thereon near one end thereof, and having a shorter end cylindrical and smooth, and the longer end screw-threaded, the smooth end of said pin fitting and turning freely in the opening of one of the said plates and the screw-threaded end thereof engaging screw-threads within the opening of the other of said plates, and a staple fitting over the square boss in said pin and locking the said pin against turning, substantially as described.

In testimony whereof we affix our signatures in presence of two witnesses.

DEMOSS MARCOTT.
GERARD ESVELDT.

Witnesses:
GEO. P. CRAGIN,
M. M. HUFF.